United States Patent [19]

Prunier et al.

[11] 4,198,122
[45] Apr. 15, 1980

[54] CONNECTOR WITH SELF-CENTERING ELEMENTS FOR OPTICAL CONDUCTORS

[75] Inventors: Jean-Claude Prunier, Herblay; Yves Bellemon, Pecq, both of France

[73] Assignee: Societe Nouvelle de Connexion, Carrieres sur Seine, France

[21] Appl. No.: 869,134

[22] Filed: Jan. 13, 1978

[30] Foreign Application Priority Data

Jan. 28, 1977 [FR] France .................. 77 02417

[51] Int. Cl.² .............................................. G02B 5/14
[52] U.S. Cl. ................................ 350/96.21; 350/96.22
[58] Field of Search ............... 350/96.20, 96.21, 96.22

[56] References Cited

U.S. PATENT DOCUMENTS

| | | | |
|---|---|---|---|
| 3,922,064 | 11/1975 | Clark et al. | 350/96.22 |
| 3,990,779 | 11/1976 | McCartney | 350/96.21 |
| 4,060,309 | 11/1977 | Le Noane et al. | 350/96.21 X |
| 4,087,155 | 5/1978 | Deacon | 350/96.21 |
| 4,124,272 | 11/1978 | Henderson et al. | 350/96.21 |

*Primary Examiner*—John K. Corbin
*Assistant Examiner*—John D. Lee
*Attorney, Agent, or Firm*—J. Harold Nissen

[57] ABSTRACT

A connector for optical conductors, comprising a casing formed by two opposite bodies provided with complementary means for assembly of one to the other with axial pressure, each body receiving a cylindrical member comprising a shoulder portion and a barrel portion, the member being retained by the shoulder portion and disposed with the barrel portion directed toward the corresponding barrel portion of the cylindrical member mounted in the opposite body, each cylinder member further being adapted to receive an end of an optical fiber within a central bore at the end of the barrel portion in such a manner that the conductor is fixed therein with its end being flat and located in the plane of the end of the barrel portion of the cylinder, having at least two annular grooves in the barrel portion and longitudinally spaced along the length of the latter, the bases of the grooves being concentric with the central bore and the grooves containing torroidal joint means, and the connector further comprising a coupling member into which the barrel portions of the cylindrical members extend opposite to one another, the arrangement being such that the torroidal joint means, when under compression, allow self-centering of the cylindrical members within the coupling member when the members are engaged against one another under the action of complementary fixing means.

9 Claims, 1 Drawing Figure

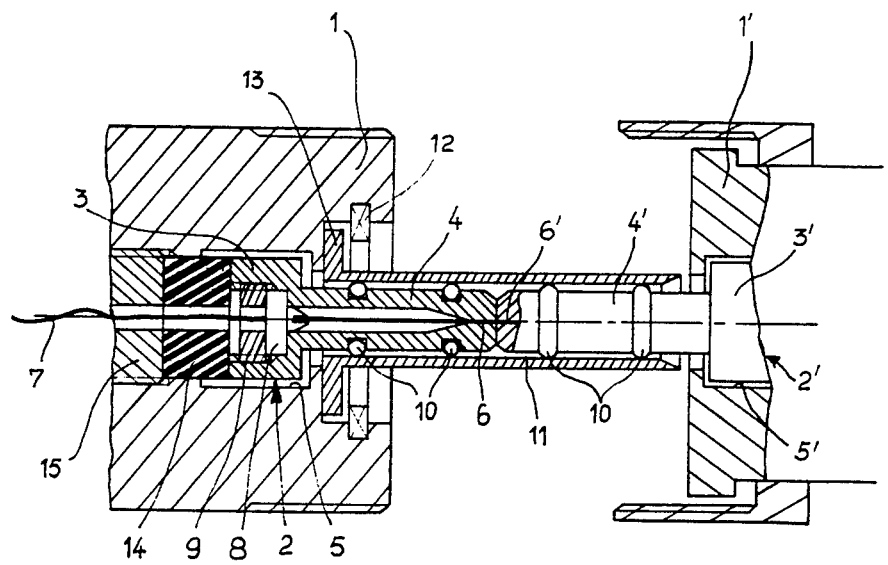

CONNECTOR WITH SELF-CENTERING ELEMENTS FOR OPTICAL CONDUCTORS

The present invention relates to connectors for optical conductors, and more particularly concerns a connector with self-centering elements for optical conductors of monofilament or multifilament type.

By optical conductors of the monofilament type are meant all optical conductors of which the light conduit as such consists of a single fibre, which may be glass, silica or plastic material, while a multifilament conductor comprises a plurality of fibres assembled in a bundle.

The device according to the present invention is applicable more especially, but not exclusively, to optical conductors of monofilament type.

It is well known that a connection between two optical conductors must fulfill rigorous conditions if it is desired that the connection should not introduce substantial light losses in the junction. These conditions are of two kinds. They concern on the one hand the aspect of the surface of the ends of the conductors to be connected. For a good joint of two cylindrical conductors, this surface should be both as perfectly polished as possible, and be perpendicular to the generatrices of the cylinder.

On the other hand these conditions concern the geometrical relative positions of the two ends to be connected: the ends of the optical conductors to be joined must, as far as possible, touch one another and constantly exert a contact pressure between them in order to promote this contact, and the angular alignment and the alignment of the axes of the conductors should be precise in the region of the transition from one conductor to the other. In the case of a junction of two monofilaments, these two latter conditions should be about 1 degree and about 2 or 3 microns, respectively.

In order to satisfy these requirements, the connectors presently used comprise precision mechanical devices of which the tolerances of manufacture and of assembly are very small, in which the ends of the conductors to be joined are associated with contacts admitting of longitudinal displacement and are restrained in their positions of connection by a force generated most often by resilient members such as springs. These known connectors have the disadvantage of being expensive and, on the other hand, their setting up is lengthy and complicated.

The object of the present invention is to provide a connector of which the performance is at least equal to that of known devices without requiring a lengthy and complicated setting up operation for the connection and disconnection of the optical fibres.

The invention accordingly provides a connector for optical conductors, comprising a casing formed by two opposite bodies provided with complementary means for assembly of one to the other with axial pressure, each body receiving a cylindrical member comprising a shoulder portion and a barrel portion, the said member being retained by the shoulder portion and disposed with the barrel portion directed towards the corresponding barrel portion of the cylindrical member mounted in the opposite body, each cylinder member further being adapted to receive an end of an optical fibre within a central bore at the end of the barrel portion in such a manner that the conductor is fixed therein with its end being flat and located in the plane of the end of the barrel portion of the cylinder, having at least two annular grooves in the barrel portion and longitudinally spaced along the length of the latter, the bases of said grooves being concentric with the said central bore and said grooves containing toroidal joint means, and the connector further comprising a coupling member into which the barrel portions of the cylindrical members extend opposite to one another, the arrangement being such that the toroidal joint means, when under compression, allow self-centering of the cylindrical members within the said coupling member when the latter are engaged against one another under the action of the complementary fixing means.

The shoulder portion of each cylindrical member is preferably received in an internal bore of the corresponding body in such a manner that the member is floatingly mounted in its body.

Likewise, the coupling member can preferably be assembled by one of its ends to one of the bodies in such a manner that it is floatingly mounted in this body, in which it is retained by a ring.

For urging each cylindrical member in the direction of the opposite member, a resilient element is disposed in each body and engages with the shoulder portion of the cylindrical member. When the cylindrical members come into endwise contact, this resilient element allows a reverse movement of the said member assuring that the contact between the two ends of the optical conductors is affected under suitable conditions.

The connector according to the present invention of which the joining members are floatingly mounted, and for which the only precision required is that the bases of the grooves receiving the joint means and the central bore receiving the extremities of the optical conductor should be concentric, has moreover, the advantage of being less expensive in relation to known devices.

The invention is illustrated by way of example in the accompanying drawing, the single FIGURE of which shows a connector according to the invention.

Referring to the drawing, the casing of the connector is constituted by two bodies 1 and 1', which can be brought together with one another by any known conventional means, for example by screwing, this means providing for an axial pressure of one of the bodies 1 and 1' against the other.

Each of the bodies 1 and 1' is adapted to receive a cylinder 2, 2', comprising a shoulder 3, 3', and a barrel 4, 4'. The shoulders 3, 3' are arranged with axial play in internal bores 5, 5' of the bodies 1, 1' and the barrels 4, 4' are mounted in such a manner as to project from the bodies 1, 1' and are directed towards one another. The cylinders 2, 2' each receive the end of one of two optical fibres to be connected, of which one is indicated by 7. This optical fibre 7 is introduced into the cylinder 2 until it passes the central bore 6 arranged at the end of the barrel 4, then the fibre 7 is fixed in position, for example under pressure, with the aid of a deformable means 8, arranged in the shoulder 3 and held in place by a plug 9 threaded in this shoulder 3. After fixing of the fibre 7 the latter is cut at the level of the end of the barrel 4 of the cylinder 2, then carefully polished, so that the end of the fibre 7 is coplanar with the end of the cylinder 2.

Another method of fixing the optical fibre 7 in the cylinder 2 consists of breaking this fibre by thermal shock, which gives it a good surface condition at the end, then introducing it into the cylinder 2 until its extremity is coplanar with the end of the barrel 4. Then the fibre 7 is fixed with the help of the deformable means 8 while avoiding any axial displacement during the compression.

Two identical toroidal joihts 10 are each arranged in one of two circular grooves arranged in each of the barrels 4, 4', and longitudinally spaced along the latter. A coupling 11, of which the internal diameter is less than that of the base of the groove of the barrels 4, 4', increased by twice the value of the diameter of the cord forming the toroidal joints 10, when in the relaxed condition, is floatinglymounted in the body 1, in which it is retained by a ring 12, acting as an abutment for a shoulder 13 of the coupling 11.

When the bodies 1 and 1' are separated, the coupling 11 surrounds only the cylinder 2. Each of the cylinders 2, 2' is urged towards the other by a resilient element such as 14, retained in the body 1 by a plug 15, for example screwed in the body 1.

When the two bodies 1 and 1' of the casing are coupled by assembly under mutual axial pressure in any suitable known manner, the barrel 4' of the cylinder 2' opposite to the cylinder 2 of the body 1 extends into the coupling 11 and comes into opposition with the barrel 4. The toroidal joints 10 become compressed and then provide for self-centering of the barrels 4, 4' of the cylinders 2, 2' in the coupling 11, owing to the fact that the bores 6, 6', and the bases of the grooves receiving the joints 10 are concentric. The fibres such as 7, fixed within the cylinders 2, 2' and of which the corresponding ends are centered in the bores 6, 6' are located opposite one another with angular tolerances and tolerances of alignment which assure a good optical performance. On the other hand, the floating mounting of the cylinders 2, 2' by way of their shoulders 3, 3' in the bores 5, 5' of the bodies 1, 1' and the resilient elements such as 14 enable a sufficient rearward movement of the cylinders 2, 2' so that the contact pressure of the optical fibres arranged end-to-end is achieved under good conditions.

A junction between two optical conductors effected by means of a connector in accordance with the present invention can present an attenuation of the order of 1 dB for low loss optical conductors of monofilament type with stepped or sloping index, while for multifilaments, this attentuation would reach 3 to 5 dB. The connector according to the present invention can therefore advantageously be substituted for known connnectors, of which the setting up operation is longer and more complicated, and which are more expensive.

What we claim is:

1. A connector for optical conductors, comprising:
a casing formed by two opposite bodies and complementary fixing means for assembly of one of the opposite bodies to the other of the opposite bodies with axial pressure,
each said body receiving a cylindrical member comprising a shoulder portion and a barrel portion, said cylindrical member being retained by said shoulder portion and disposed with said barrel portion directed towards the corresponding barrel portion of the cylindrical member mounted in the opposite body, each of said cylindrical members being floatingly mounted with respect to its corresponding body,
each cylindrical member further being adapted to receive an end of an optical fiber within a central bore at the end of the barrel portion in such a manner that the conductor is fixed therein with its end being flat and located in the plane of the end of the barrel portion of the cylindrical member, having at least two annular grooves in the barrel portion and longitudinally spaced along the length of the latter, the bases of said grooves being concentric with the said central bore and said grooves containing toroidal joint means for the floatingly mounting of said cylindrical members with respect to the corresponding body, and
the connector further comprising a coupling member floatingly mounted with respect to both said bodies and into which the barrel portions of the cylindrical members extend opposite to one another, the arrangement being such that said toroidal joint means, when under compression, allow self-centering of the cylindrical members within the said coupling member when the latter are engaged against one another under the action of said complementary fixing means.

2. A connector according to claim 1, wherein the shoulder portion of each cylindrical member is received in an internal bore of the respective body and the cylindrical member is floatingly mounted in this body.

3. A connector according to claim 2, wherein the said coupling member is assembled by one of its ends with one of the said bodies.

4. A connector according to claim 3, wherein the said coupling member is floatingly mounted in the said one body, being retained therein by a ring.

5. A connector according to claim 1, wherein
said toroidal joint means includes a toroidal joint of compressible material for each said groove.

6. A connector according to claim 5, wherein
said toroidal joints are identical with each other.

7. A connector according to claim 1, wherein
said complementary fixing means is a common sleeve.

8. A connector according to claim 1, wherein
said coupling member is assembled by one of its ends with one of the said bodies.

9. A connector according to claim 8, wherein
said coupling member is floatingly mounted in the said one body, being retained therein by a ring.

* * * * *